United States Patent
Asada et al.

(10) Patent No.: US 10,566,706 B2
(45) Date of Patent: Feb. 18, 2020

(54) TERMINAL CONNECTOR AND TERMINAL CONNECTION METHOD

(71) Applicant: NSK LTD., Tokyo (JP)

(72) Inventors: Toshiaki Asada, Fujisawa (JP); Yusuke Kikuchi, Fujisawa (JP)

(73) Assignee: NSK LTD., Tokyo (JP)

( * ) Notice: Subject to any disclaimer, the term of this patent is extended or adjusted under 35 U.S.C. 154(b) by 312 days.

(21) Appl. No.: 15/534,150

(22) PCT Filed: Dec. 15, 2015

(86) PCT No.: PCT/JP2015/085029
§ 371 (c)(1),
(2) Date: Jun. 8, 2017

(87) PCT Pub. No.: WO2016/098759
PCT Pub. Date: Jun. 23, 2016

(65) Prior Publication Data
US 2018/0351265 A1    Dec. 6, 2018

(30) Foreign Application Priority Data
Dec. 17, 2014 (JP) ................................ 2014-254638

(51) Int. Cl.
*H01R 4/10*        (2006.01)
*B62D 5/04*        (2006.01)
(Continued)

(52) U.S. Cl.
CPC ............. *H01R 4/10* (2013.01); *B62D 5/0406* (2013.01); *H01R 4/029* (2013.01); *H01R 9/24* (2013.01);
(Continued)

(58) Field of Classification Search
CPC ........... H02K 15/0062; H02K 15/0056; H02K 11/022; H02K 11/30; H02K 11/33;
(Continued)

(56) References Cited

U.S. PATENT DOCUMENTS 2,615,725 A    10/1952   Person
4,630,882 A *   12/1986   Naylor ..................... H01R 9/24
                                                   439/444
(Continued)

FOREIGN PATENT DOCUMENTS

DE           4016663 A1    12/1990
JP            52-76612 A      6/1977
(Continued)

OTHER PUBLICATIONS

International Search Report of PCT/JP2015/085029, dated Mar. 22, 2016. [PCT/ISA/210].
(Continued)

*Primary Examiner* — Bernard Rojas
(74) *Attorney, Agent, or Firm* — Sughrue Mion, PLLC

(57) ABSTRACT

[Problem]
An object of the present invention is to provide the terminal connector and the terminal connection method that are capable of properly keeping the contact area and the contact surface pressure of the electrical contact portion for a long term even if the respective terminals of the motor and the control unit are configured at a simple shape, and to provide the optimum terminal connector and terminal connection method to use for the electric power steering apparatus, the electric actuator and so on.

[Means for solving the problem]
A terminal connector which connects between a motor-side terminal of a motor and a unit-side terminal of a control unit for the motor, wherein the terminal connector has an elec-
(Continued)

trical contact due to a formation of a junction site between the motor-side terminal and the unit-side terminal by abutting the motor-side terminal and the unit-side terminal and applying a plastic deformation with a machine work to an abutted portion.

15 Claims, 7 Drawing Sheets

(51) Int. Cl.
*H02K 5/22* (2006.01)
*H02K 15/00* (2006.01)
*H02K 11/33* (2016.01)
*H01R 4/02* (2006.01)
*H01R 9/24* (2006.01)
*H01R 12/55* (2011.01)
*H01R 43/04* (2006.01)
*H02K 11/30* (2016.01)
*H02K 11/22* (2016.01)

(52) U.S. Cl.
CPC ............ *H01R 12/55* (2013.01); *H01R 43/04* (2013.01); *H02K 5/225* (2013.01); *H02K 11/33* (2016.01); *H02K 15/0062* (2013.01); *H01R 2201/10* (2013.01); *H02K 11/022* (2013.01); *H02K 11/30* (2016.01); *H02K 15/0056* (2013.01); *H02K 2211/03* (2013.01)

(58) Field of Classification Search
CPC .... H02K 2211/03; H02K 5/225; H01R 4/029; H01R 4/10; H01R 9/24
See application file for complete search history.

(56) References Cited

U.S. PATENT DOCUMENTS

| | | | | |
|---|---|---|---|---|
| 5,777,410 | A | 7/1998 | Asakura et al. | |
| 6,304,448 | B1* | 10/2001 | Fukada | H05K 7/209 |
| | | | | 174/16.3 |
| 9,853,373 | B2* | 12/2017 | Kurono | H01R 9/2416 |
| 2004/0242034 | A1* | 12/2004 | Rinehart | H01H 33/662 |
| | | | | 439/100 |
| 2009/0250287 | A1 | 10/2009 | Takashima et al. | |
| 2011/0285336 | A1 | 11/2011 | Fujita et al. | |
| 2013/0062137 | A1 | 3/2013 | Motoda | |
| 2014/0329417 | A1* | 11/2014 | Matsuzaki | H02K 5/225 |
| | | | | 439/709 |

FOREIGN PATENT DOCUMENTS

| | | |
|---|---|---|
| JP | 9-219957 A | 8/1997 |
| JP | 10-12289 A | 1/1998 |
| JP | 11-297373 A | 10/1999 |
| JP | 2003-142178 A | 5/2003 |
| JP | 2005-229753 A | 8/2005 |
| JP | 2009-248754 A | 10/2009 |
| JP | 2010-215233 A | 9/2010 |
| JP | 2012-110176 A | 6/2012 |
| JP | 2013-46527 A | 3/2013 |
| JP | 2013-196803 A | 9/2013 |
| JP | 2013-196973 A | 9/2013 |
| JP | 2014-182932 A | 9/2014 |
| JP | 2014-187751 A | 10/2014 |
| JP | 2014-204477 A | 10/2014 |
| WO | 2007/108049 A1 | 9/2007 |

OTHER PUBLICATIONS

Communication dated Oct. 11, 2017 issued by the European Patent Office in counterpart application No. 15869964.5.

* cited by examiner

TERMINAL CONNECTOR AND TERMINAL CONNECTION METHOD

CROSS REFERENCE TO RELATED APPLICATIONS

This application is a National Stage of International Application No. PCT/JP2015/085029 filed Dec. 15, 2015, claiming priority based on Japanese Patent Application No. 2014-254638, filed Dec. 17, 2014, the contents of all of which are incorporated herein by reference in their entirety.

TECHNICAL FIELD

The present invention relates to a terminal connector and a terminal connection method to electrically connect a motor used for an electric power steering apparatus, an electric actuator and so on and a control unit including a driving circuit thereof.

BACKGROUND ART

Conventionally, an electric power steering apparatus which applies a steering auxiliary torque to a steering system of a vehicle by reducing a rotation of an electric motor (hereinafter, simply called "motor") with a gear box and an electric actuator which performs a movement of a substance, a positioning and so on by converting a rotation of the motor to a rectilinear motion by using a ball screw or the like, are known. Then, in the electric power steering apparatus and the electric actuator, in order to miniaturize the apparatus and to prevent a noise generation, a mechatronical integration-type motor unit which integrates a control unit (ECU) including a control substrate, a power substrate and so on which are mounted a control circuit for drive-controlling the motor with the motor, is known.

A method for electrically connecting the motor and the ECU, for example, is disclosed in Japanese Unexamined Patent Publication No. 2013-196803 A (Patent Document 1). In an electrical connection between a motor unit and a driving unit, the terminal connector described in Patent Document 1 is a structure mounted a protrusion in such a way that a tip fork of a second conducting terminal is opened by inserting a base end fork of a first conducting terminal and the second conducting terminal in order to connect the first conducting terminal arranged a through hole and the second conducting terminal arranged a pair of fork portions with a slit provided from a tip of a plate member to a base end thereof.

Moreover, a terminal connector described in Unexamined Patent Publication No. 2013-196973 A (Patent Document 2) provides a slit for allowing a rotational position aberration of a plate terminal on a bottom of a fork terminal side of a diapason terminal.

THE LIST OF PRIOR ART DOCUMENTS

Patent Document

Patent Document 1: Japanese Unexamined Patent Publication No. 2013-196803 A
Patent Document 2: Japanese Unexamined Patent Publication No. 2013-196973 A

SUMMARY OF THE INVENTION

Problems to be Solved by the Invention

However, in the methods described in Patent Documents 1 and 2, there is a problem in any methods that it needs to strictly control a precision of respective terminals in order to properly keep a contact area and a contact surface pressure of the electrical contact portion when the motor and the control unit are mechanically abutted and electrically connected.

The present invention is to solve the above problems, therefore, an object of the present invention is to provide the terminal connector and the terminal connection method that are capable of properly keeping the contact area and the contact surface pressure of the electrical contact portion for a long term even if the respective terminals of the motor and the control unit are configured at a simple shape, and to provide the optimum terminal connector and terminal connection method to use for the electric power steering apparatus, the electric actuator and so on.

Means for Solving the Problems

The present invention relates to a terminal connector which connects between a motor-side terminal of a motor and a unit-side terminal of a control unit for the motor, the above-described object of the present invention is achieved by that: wherein the terminal connector has an electrical contact due to a formation of a junction site between the motor-side terminal and the unit-side terminal by abutting the motor-side terminal and the unit-side terminal and applying a plastic deformation with a machine work to an abutted portion.

The above-described object of the present invention is more effectively achieved by that: wherein a processing site of a hole, or a recess machining, or a convex machining, or a bending, or a thinning is formed on at least one of the motor-side terminal and the unit-side terminal, and the motor-side terminal and the unit-side terminal positioned at the processing site are abutted; or wherein a retaining mechanism of the junction site is formed with a formation of the junction site; or wherein the machine work is at least one of a clinch calking, an eyelet calking and a rivet calking; or wherein the machine work is a combination of any one of a clinch calking, an eyelet calking, a rivet calking with a welding; or wherein the junction sites are formed on plural places; or wherein the motor-side terminal and the unit-side terminal are made of same material; or wherein the material is plated to copper or copper alloy; or wherein the control unit includes a control substrate, an insert mold plate, a power substrate and a heat sink, and the unit-side terminal extends from the insert mold plate; or wherein the control unit includes a control substrate, an insert mold plate, a power substrate and a heat sink, and the unit-side terminal extends from the power substrate; or wherein an expansion of the junction site is along a shaft direction of the motor; or wherein an expansion of the junction site is along a diameter direction of the motor.

Further, the present invention relates to a terminal connection method which connects between a motor-side terminal of a motor and a unit-side terminal of a control unit of the motor, the above-described object of the present invention is achieved by that: comprising steps of abutting the motor-side terminal and the unit-side terminal, applying a plastic deformation with a machine work to an abutted portion, forming a junction site between the motor-side terminal and the unit-side terminal and forming an electrical contact of the motor-side terminal and the unit-side terminal; or comprising steps of forming a processing site of a hole, or a recess machining, or a convex machining, or a bending, or a thinning on at least one of the motor-side terminal or the unit-side terminal, abutting the motor-side terminal and the unit-side terminal positioned at the processing site, applying a plastic deformation with a machine work to an abutted portion, forming a junction site between the motor-side terminal and the unit-side terminal and forming an electrical contact of the motor-side terminal and the unit-side terminal.

Effects of the Invention

According to the configuration of the terminal connector and the terminal connection method of the present invention, it is not necessary to accurately perform a machine work for a connecting terminal as the prior art. Further, since the present invention abuts the terminal before the machining to a position in accordance with a rule and connects between the terminals by machining (plastically deforming) the abutted portion, it does not effectively need to strictly control the positional accuracy of the respective terminals. It is possible to adequately keep the contact area and the contact surface pressure of the electrical connection portion for a long term since the connection is performed by the machine work.

Further, in the machine work of the connection terminal, it is possible to perform the machine work to a portion receiving a mechanically machined force via an insulating site by utilizing a high rigidity site of the control unit, and therefore the present invention has the effect that an excessive stress does not apply to a terminal root of the motor or the control unit.

MODE FOR CARRYING OUT THE INVENTION

The present invention is a terminal connector and a terminal connection method which connects between a motor-side terminal of a motor (for example, a 3-phase brushless motor) and a unit-side terminal of a control unit including a driving circuit of the motor. Concretely, the present invention abuts a tabular or L-shape motor-side terminal and a tabular or L-shape unit-side terminal, forms a junction site between the terminals (a portion of overlapping or a full scale) by applying a plastic deformation due to a machine work (for example, a clinch calking, an eyelet calking and so on) on one portion or plural portions of the abutted portion, and forms an electric contact or forms a retaining mechanism of the junction site with a formation of the junction site, thereby to adequately keep a contact area and a contact surface pressure of an electrical contact portion for a long term.

Moreover, in the control unit including a control substrate, an insert mold plate, a power substrate and a heat sink, the unit-side terminal is extended from the insert mold plate or the power substrate, and a processing site such as a hole, a recess machining, a convex machining, a bending or a thinning for facilitating workability is formed against at least one of the motor side-terminal or the unit-side terminal. Consequently, the high accurate connecting of the terminals is possible though the positioning is easy.

Furthermore, an expansion of the junction portion is along a direction of a shaft of the motor in one embodiment of the present invention, and the expansion of the junction portion is along a diameter of the motor in other embodiment of the present invention.

Hereinafter, the embodiment of the present invention will be explained with reference to figures.

Figure 1:
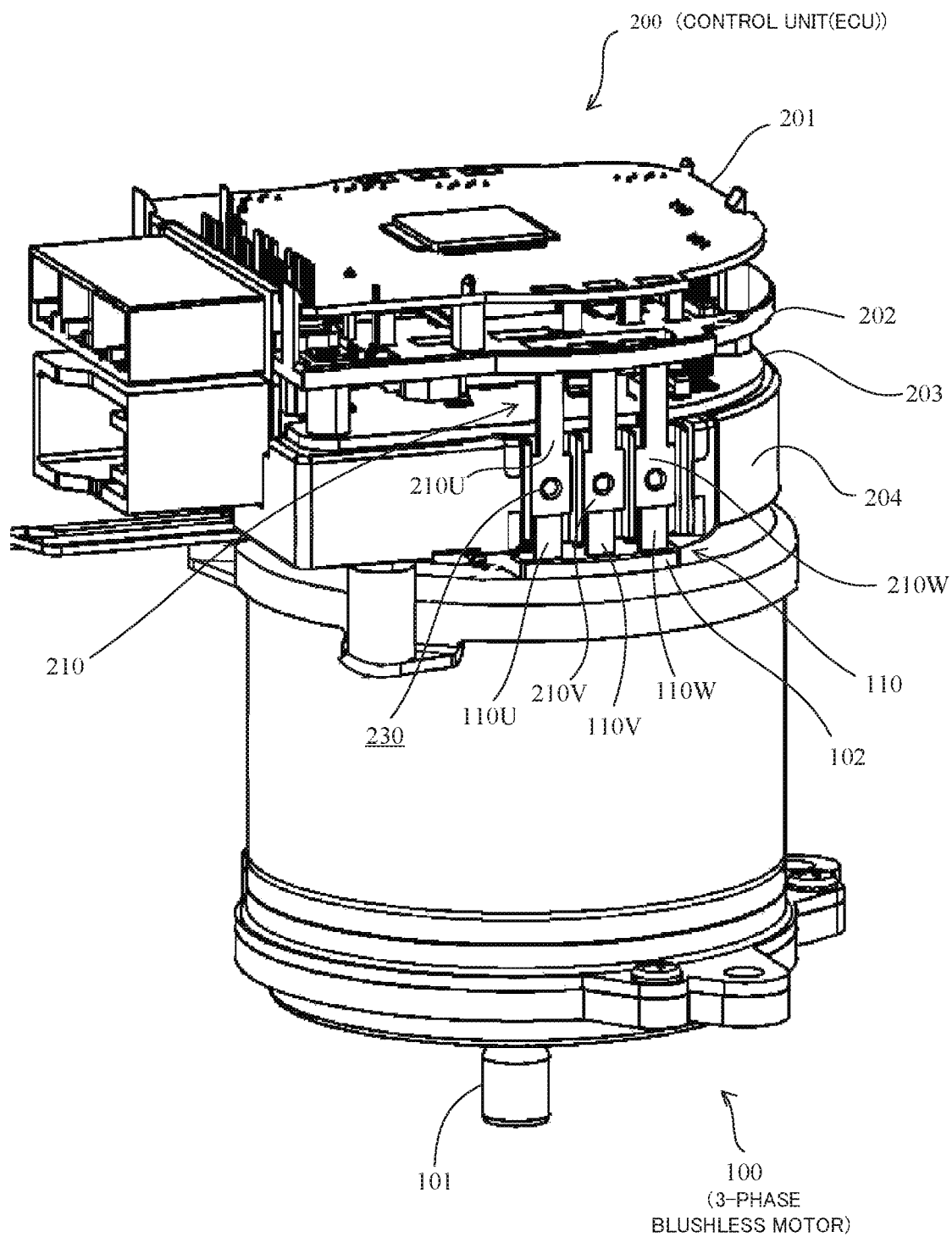
FIG. 1 is a perspective view showing a motor apparatus in the first embodiment of the present invention.

FIG. 1 is a perspective view showing a motor apparatus constituted by integrating a 3-phase (U, V, W) brushless motor 100 and a control unit (ECU) 200 in the first embodiment of the present invention, and the apparatus is mechatronical integration-type structure. The motor 100 comprises an output shaft 101 serving as a driving shaft, and tabular motor-side terminals 110 (110U, 110V, 110W) are provided, extending onto a shaft direction, on a shaft-direction end surface of an opposite side of the output shaft 101.

Further, the control unit 200 integrally provided on the shaft-direction end surface of an opposite side of the output shaft 101 of the motor 100 is a 4-stage structure in the present embodiment. That is, the control unit 200 has the 4-stage structure in layers comprising a control substrate 201 mounted a microcomputer and so on at the first stage from the opposite side (upper side in view) of the output shaft 101; an insert mold plate 202 connected to a circuit, mounted discrete parts such as a coil, a condenser and so on at the second stage, on which a metal terminal is insert-molded by resin; a power substrate (an aluminum substrate) 203 on which a power device such as FET and so on is mounted at the third stage; and a heat sink (a heat radiation material) 204 that the heat radiation of the power substrate 203 and the attachment of the motor 100 are secured thereunder. The unit-side terminals 210 (210U, 210V, 210W) of the control unit 200 are plate structure and are mounted by extending to the shaft direction in such a way to overlay from the insert mold plate 202 to the motor-side terminals 110 (110U, 110V, 110W). The machine work (plastic deformation) as stated below is proceeded between the unit-side terminals 210 (210U, 210V, 210W) and the motor-side terminals 110 (110U, 110V, 110W) on a machining section 230, and the unit-side terminals 210 and the motor-side terminals 110 are connected on an electrical contact by forming a junction site. Range of the junction site may be a part of or a full scale of an overlapping portion between the unit-side terminals 210 and the motor-side terminals 110.

In this way, since the unit-side terminals 210U, 210V, 210W and the motor-side terminals 110U, 110V, 110W are electrically connected on each junction portion, respectively, it is possible to drive and control the motor 100 by the control unit 200.

Figures 2A, 2B:
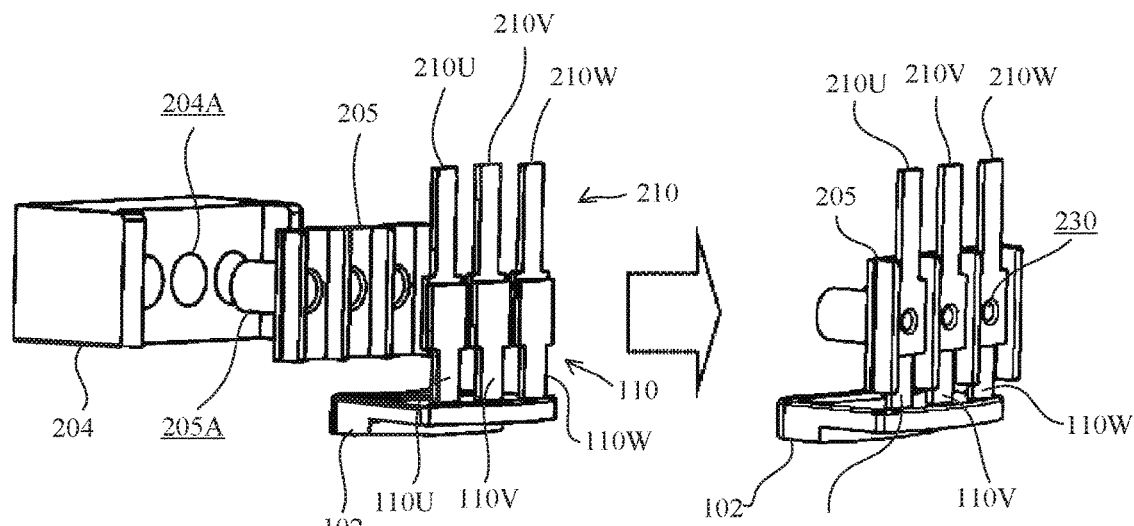
FIGS. 2A and 2B are enlarged partial views showing a constitutional example of a terminal portion in the first embodiment of the present invention.

FIGS. 2A and 2B show detailed constitutional examples of each abutted portion between the motor-side terminals 110 and the unit-side terminals 210, and an insulating member 205 for electrically insulating the terminals 110 and 210 is mounted on the heat sink 204. The insulating member 205, as shown in FIG. 2A, is resin-molded to a recessed shape in such a way to engage by enfolding the terminals 110 and 210 on a longitudinal direction in view, and three cylindrical portions 205A are formed on a back side. Further, three insert holes 204A are provided on the heat sink 204, the respective cylindrical portions 205A of the insulating member 205 are respectively inserted into the insert holes 204A and are fixed by a method such as a press, a bolt retaining, a snap-fit and so on. The unit-side terminals 210 are pulled out from the insert mold plate 202 of upper side in view, the motor-side terminals 110 are pulled out from a terminal block 102 of lower side in view, and the terminals are abutted on the recess portion of the insulating member 205. On the state (FIG. 2B), the plastic deformation is performed for the machining section 230 of the abutted portion with a tool for machining, and the junction portion between the unit-side terminal 210 and the motor-side terminal 110 is formed. The respective tips of the motor-side terminal 110 and the unit-side terminal 210 are engaged on the insulating member 205, the abutted portion is formed on the overlapping portion of the motor-side terminal 110 and the unit-side terminal 210, and the state that the junction portion is formed on the abutted portion is shown in FIG. 2B.

Figures 3A, 3B:
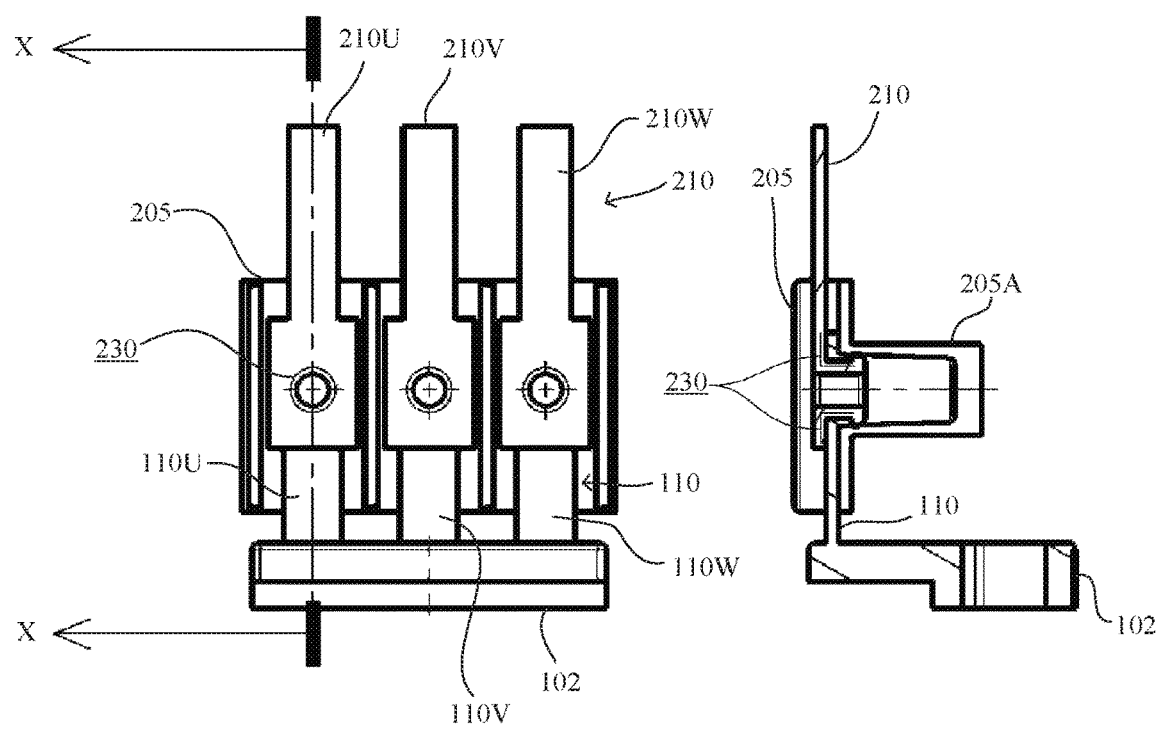
FIGS. 3A and 3B are a front view and an X-X sectional view of the terminal portion in the first embodiment of the present invention.

FIG. 3A is a front view of the state that the respective tips of the motor-side terminal 110 and the unit-side terminal 210 are overlapped and engaged on the recess portion 205A of the insulating member 205 and the junction portion is formed on the machining section 230, and a sectional view along an X-X arrow is FIG. 3B. As shown in the sectional structure of FIG. 3B, the machining section 230 engages with the recess portion 205A of the insulating member 205, the junction portion is formed by the plastic deformation of the unit-side terminal 210 and the motor-side terminal 110, and they constitute the electric contact of the motor 100 and the control unit 200. In order to protect a metal of the terminal(s) of the diameter direction, an insulating case or the like may be covered.

Next, one example of a method for forming a junction portion comprising the steps of overlapping and abutting the respective tips of the motor-side terminals 110 and the unit-side terminals 210t and forming the junction portion on the abutted portion by the machining work, will be explained with reference to FIGS. 4A to 4C.

Figure 4A:
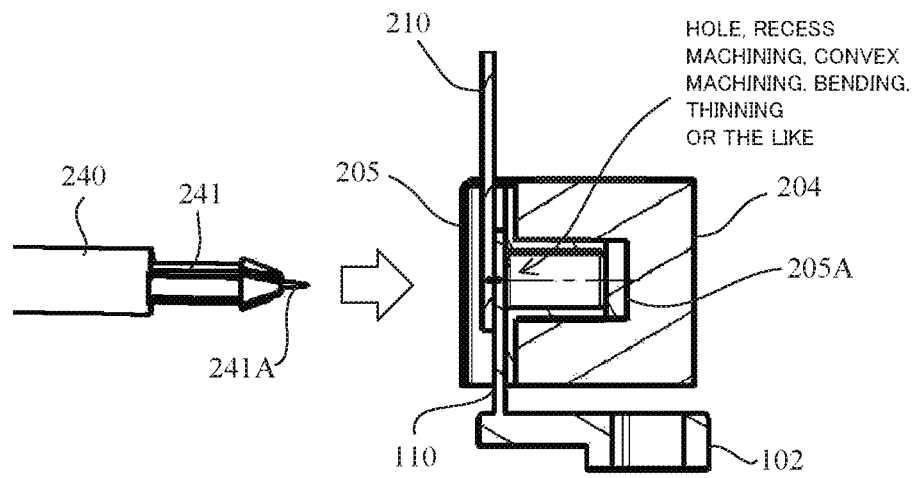
FIGS. 4A to 4C are views showing a machining method of a terminal contact site in the first embodiment of the present invention.
Figure 4B:
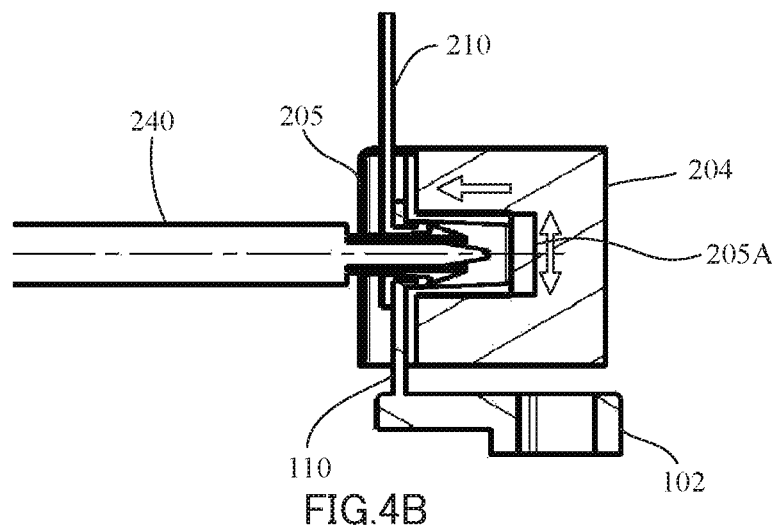

A tool for using of the machining, e.g. as shown in FIG. 4, is comprised of a collet 240 enable forward or backward and a core section 241 having a wedge shape on outside, which is fitted in an inner diameter of the collet 240 and of which a hole opening 241A is formed on the tip. The collet 240 is capable using an oil-hole collet, a straight collet, a Morse taper collet, a tap collet and so on. Moreover, a processing site such as a hole, a recess processing, a convex processing, a bending or a thinning for facilitating the workability of the machining section 230 may be formed on at least one of the motor-side terminal 110 or the unit-side terminal 210. Here, the machining (the plastic deformation) by the tool is performed as follows:

[1] The collet 240 is forwarded by positioning the tool as shown in FIG. 4A, and a hole is provided to the abutted portion (the machining section 230) between the motor-side terminal 110 and the unit-side terminal 210 with the hole opening 241A of the core section 241.

[2] When the wedge shape tip of the core section 241 is inserted to the insulating member 205, the wedge shape tip is extended by further inserting only the core section 241.

[3] Next, the collet 240 is backward, and then the junction portion is formed on the abutted portion of the respective terminals 110 and 210. By going back the collet 240, the retaining mechanism of the junction portion is simultaneously formed.

Figure 4C:
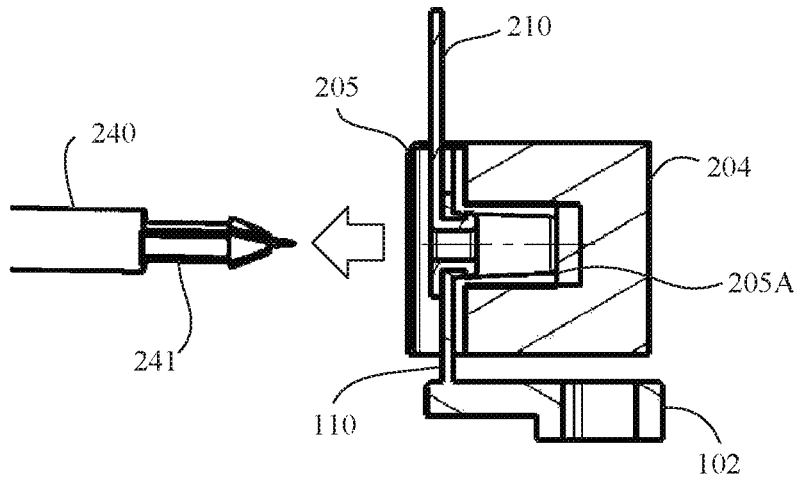

[4] The core section 241 is backward and pulled out as shown in FIG. 4C, and the tool is pulled out by shrinking the wedge shape.

By the above methods [1] to [4], it is possible to adequately keep the contact area and the contact surface pressure of the electrical contact portion for a long term irrespective of the relation such as the shapes of the motor-side terminal 110 and the unit-side terminal 210 or the machining accuracy.

Figure 5:
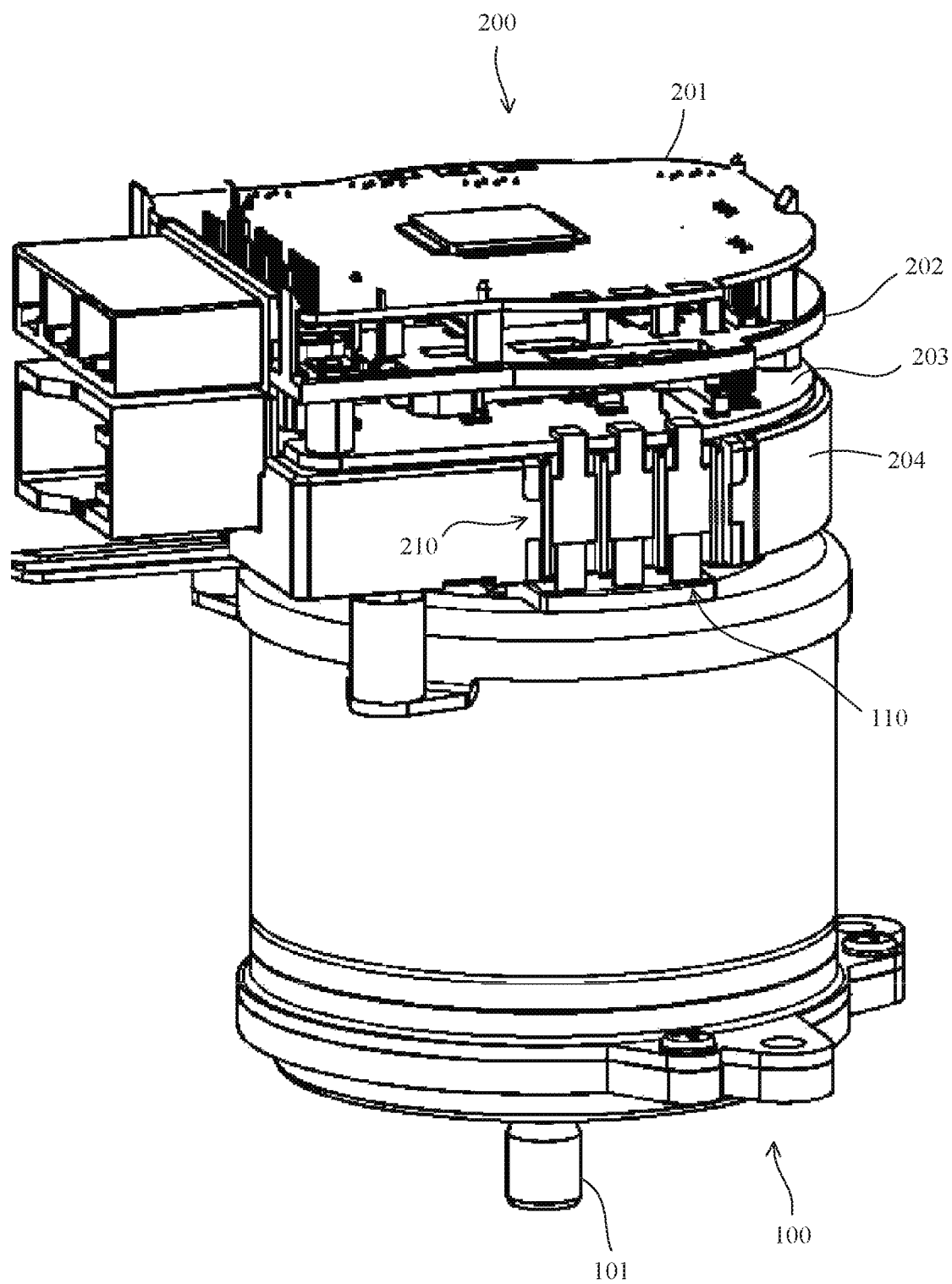
FIG. 5 is a perspective view showing another constitutional example of an ECU-side terminal in the first embodiment of the present invention.

As well, although the unit-side terminals 210 are provided by extending from the insert mold plate 202 in the above embodiment as shown in FIG. 1, the unit-side terminals 210 may be also provided by extending from the power substrate 203 as shown in FIG. 5.

Next, the second embodiment of the present invention will be explained with reference to FIG. 6.

In the above first embodiment, the direction of the machining is a motor diameter direction, and the expansion of the abutted portion between the motor-side terminal 110 and the unit-side terminal 210 is along the shaft direction of the motor 100. However, in the second embodiment, alternatively, a direction of a machining is a cross direction at a motor diameter, and an expansion of an abutted portion is a structure along a direction of a diameter of a motor 100. Also, in the second embodiment, a junction portion between a motor-side terminal 110 and a unit-side terminal 210 is formed by applying a plastic deformation with machine works from a P-direction and a Q-direction to the abutted portion between the motor-side terminal 110 and the unit-side terminal 210.

Figure 6:
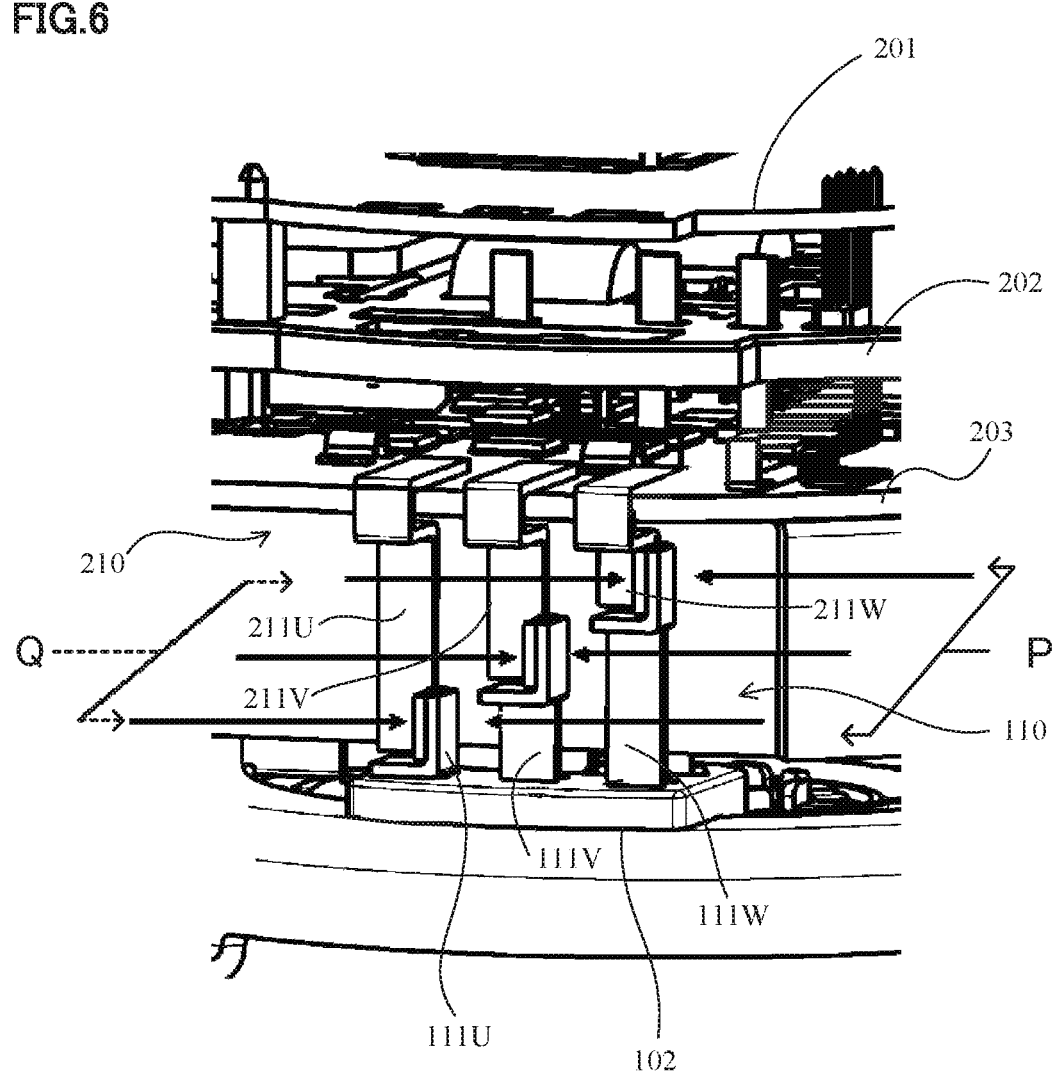
FIG. 6 is an enlarged perspective view showing a terminal in the second embodiment of the present invention.

FIG. 6 shows details of the abutted portion of the second embodiment, the unit-side terminal 210 extending down from a power substrate 203 comprises a tabular longitudinal U-phase terminal 211U which is bent at upper side, a tabular intermediate-length V-phase terminal 211V which is bent at upper side, and a tabular short-size W-phase terminal 211W which is bent at upper side. A flat surface of the respective terminals 211U to 211W is arranged in parallel to the motor shaft. Further, the motor-side terminal 110 extending up from a terminal block 102 comprises a U-phase terminal 111U which is made of a L-shape member, a V-phase terminal 111V which has a structure mounted the L-shape member on a tip of a flat plate (short), and a W-phase terminal 111W which has a structure mounted the L-shape member on a tip of a flat plate (long). The respective inner surfaces of the L-shape members of the terminals 111U to 111W abut on the surfaces of lower-right sides of the unit-side terminals 211U to 211W and form abutted portions.

In such structures, since each width direction of the abutted portions of the terminals 211U to 211W and 111U to 111W is along the motor diameter direction and height of the abutted portions are different with stair-like, it is also easy to perform the machining. The formation of the junction portion with the machine work may be formed by inserting the tool from the P-direction and the Q-direction shown in FIG. 6 and connecting the abutted portions of the respective terminals 211U to 211W and 111U to 111W with a pressure welding or the like.

In the embodiment in FIG. 6, the abutted portion of the U-phase is low, the abutted portion of the W-phase is high, and the abutted portion of the V-phase is intermediate. However, the relationship of these heights can be suitably changed. With regard to the U-phase, although the motor-side terminal 111U being the L-shape member is directly mounted on the terminal block 102 without using a flat plate, the terminal may be also mounted on the tip by using the flat plate as other phases. Moreover, although the unit-side terminal 210 is extending from the power substrate 203, the terminal may be also extending from the insert mold plate 202 in similar to the embodiment of FIG. 1.

Furthermore, it is possible to obtain the structure which no stress applies to the terminals at the machining time, fixing the plastic molding product to the heat sink with a bolted down, a snap-fit and so on, and then by welding the unit-side terminal 210 with the control unit.

Figure 7:
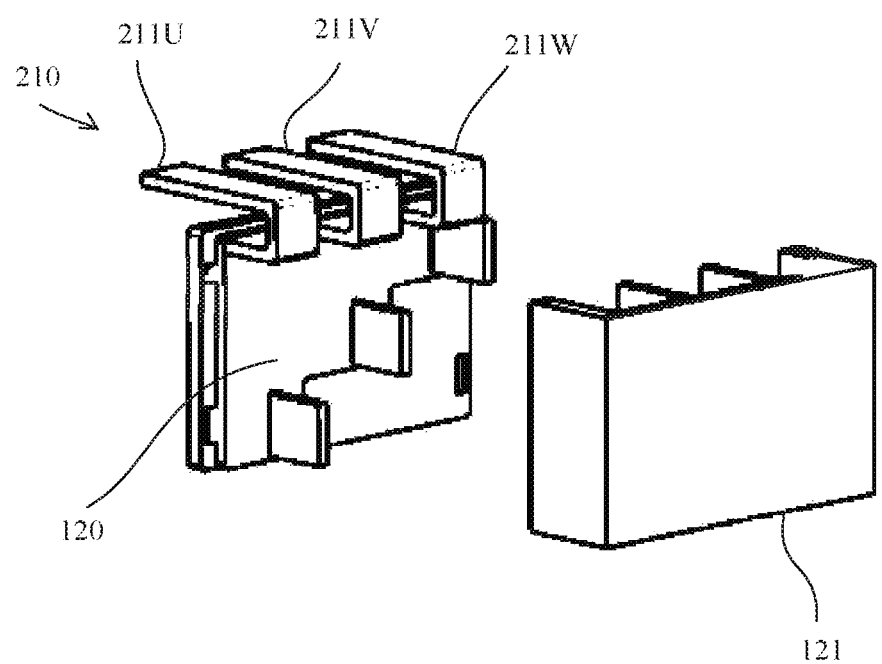
FIG. 7 is a perspective view showing a resin molding constitutional example of a terminal portion in the second embodiment of the present invention.

FIG. 7 shows a structure that: a resin mold 120 is performed to the surfaces of the unit-side terminals 210 (211U to 211W) and the motor-side terminals 110 (111U to 111W) after the terminal connecting with the machine work, and a cover 121 for the insulation between the terminals is covered with the plastic mold product.

Figure 8:
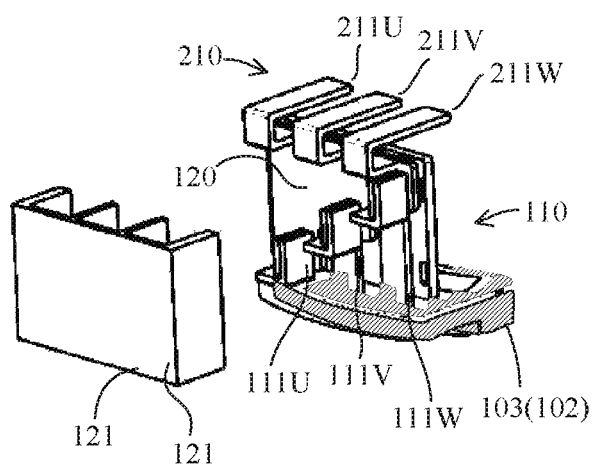
FIG. 8 is a perspective view showing a state of welding a unit-side terminal and a motor-side terminal after the resin molding.

Further, FIG. 8 shows the appearance when the plastic-molded unit-side terminal 210 and the plastic-molded motor-side terminal 110 are welded, and the motor-side terminal 110 is performed the resin mold 103. The oblique-line portion of the terminal block 102 indicates the resin mold 103.

As well, in the respective embodiments, the machine work is/are not only performed on one portion, but also may be performed on plural portions to the respective terminals. Further, type of the machine work is suitably usable of a clinch calking, an eyelet calking, a rivet connection and so on, and plural machine works may be combined. As multiple connection methods, it is possible to use the methods, e.g. the method of fitting the rivet to the clinch calking, the method of fitting the rivet to the eyelet calking and so on. Furthermore, by using the welding (laser, resistance, TIG (tungsten inert gas), ultrasonic wave) together with the clinch calking and so on, it is possible to fortify the junction portion still more.

As an embodiment of a junction surface of the junction site, the respective terminal members for connecting are preferably used the same materials. The structure to suppress the oxidation of the junction surface may be used by making plating to copper or copper alloy.

According to the above embodiments, it is not necessary to accurately perform the machining to the connector terminal as the prior art, the terminals before the machining are adjusted to the positions in a rule, and the machining is performed at the adjusted position and is connected. Accordingly, the present invention has the effect that it does not need to strictly control the location accuracy of the respective terminals. Moreover, in the machining, it is possible to machine via the insulating site to a portion receiving a machining force by using a high rigidity site of the control unit, the present invention has the effect that the excessive stress does not apply to a terminal root of the motor or driving circuit side.

EXPLANATION OF REFERENCE NUMERALS

100 3-phase brushless motor
101 output shaft
102 terminal block
110 (110U to 110W, 111U to 111W) motor-side terminal
200 control unit (ECU)
201 control substrate
202 insert mold plate
203 power substrate (aluminum substrate)
204 heat sink
205 insulating member
210 (210U to 210W, 211U to 211W) unit-side terminal

The invention claimed is:

1. A terminal connector which connects between each phase terminal of a motor-side terminal of a motor and a unit-side terminal of a control unit for said motor, the motor having a shaft extending in a shaft direction,
   wherein processing sites of a hole, or a recess machining, or a convex machining, or a bending, or a thinning are formed on at least one of said motor-side terminal and said unit-side terminal in the shaft direction in a stair-like manner so as to be at different heights,
   wherein junction sites of said motor-side terminal and said unit-side terminal are formed on plural places by abutting a portion of said each phase terminal of said motor-side terminal with a portion of said each phase terminal of said unit-side terminal to form abutting portions which extend in a radial direction of said motor, and are positioned at said processing sites, and plastic deformation is applied to the abutting portions in a direction perpendicular to said radial direction of said motor with a machine work, and
   wherein an electrical contact is formed, and a retaining mechanism of said junction sites is formed.

2. The terminal connector according to claim 1, wherein said machine work is at least one of a clinch calking, an eyelet calking and a rivet calking.

3. The terminal connector according to claim 1, wherein said machine work is a combination of any one of a clinch calking, an eyelet calking, a rivet calking with a welding.

4. The terminal connector according to claim 1, wherein said motor-side terminal and said unit-side terminal are made of same material.

5. The terminal connector according to claim 4, wherein said material is plated to copper or copper alloy.

6. The terminal connector according to claim 1, wherein said control unit includes a control substrate, an insert mold plate, a power substrate and a heat sink, and said unit-side terminal extends from said insert mold plate.

7. The terminal connector according to claim 2, wherein said control unit includes a control substrate, an insert mold plate, a power substrate and a heat sink, and said unit-side terminal extends from said insert mold plate.

8. The terminal connector according to claim 3, wherein said control unit includes a control substrate, an insert mold plate, a power substrate and a heat sink, and said unit-side terminal extends from said insert mold plate.

9. The terminal connector according to claim 1, wherein said control unit includes a control substrate, an insert mold plate, a power substrate and a heat sink, and said unit-side terminal extends from said power substrate.

10. The terminal connector according to claim 2, wherein said control unit includes a control substrate, an insert mold plate, a power substrate and a heat sink, and said unit-side terminal extends from said power substrate.

11. The terminal connector according to claim 3, wherein said control unit includes a control substrate, an insert mold plate, a power substrate and a heat sink, and said unit-side terminal extends from said power substrate.

12. The terminal connector according to claim 1, wherein an expansion of said junction site is along a shaft direction of said motor.

13. The terminal connector according to claim 1, wherein an expansion of said junction site is along a radial direction of said motor.

14. A terminal connection method which connects between each phase terminal of a motor-side terminal of a motor and each phase terminal of a unit-side terminal of a control unit of said motor, the motor having a shaft extending in a shaft direction, the method comprising steps of:
- abutting a portion of said each phase terminal of said motor-side terminal with a portion of said each phase terminal of said unit-side terminal to form abutting portions which extend to a radial direction of said motor, the abutting portions being arranged in a stair-like manner in the shaft direction so as to be at different heights;
- applying a plastic deformation to the abutting portions in a direction perpendicular to said radial direction of said motor with a machine work;
- forming junction sites between said motor-side terminal and said unit-side terminal;
- forming a retaining mechanism of said junction sites; and
- forming an electrical contact of said motor-side terminal and said unit-side terminal.

15. A terminal connection method which connects between each phase terminal of a motor-side terminal of a motor and each phase terminal of a unit-side terminal of a control unit of said motor, the motor having a shaft extending in a shaft direction, the method, comprising steps of:
- forming processing sites of a hole, or a recess machining, or a convex machining, or a bending, or a thinning on at least one of said motor-side terminal or said unit-side terminal in a shaft direction in a stair-like manner so as to be at different heights;
- abutting a portion of said each phase terminal of said motor-side terminal with a portion of said each phase terminal of said unit-side terminal to form abutting portions which extend in a radial direction of said motor and are positioned at said processing sites;
- applying a plastic deformation to abutting portions in a direction perpendicular to said radial direction of said motor with a machine work;
- forming junction sites between said motor-side terminal and said unit-side terminal;
- forming a retaining mechanism of said junction sites; and
- forming an electrical contact of said motor-side terminal and said unit-side terminal.

* * * * *